United States Patent
Peng et al.

(10) Patent No.: US 7,619,825 B1
(45) Date of Patent: Nov. 17, 2009

(54) COMPACT HEAD UP DISPLAY WITH WIDE VIEWING ANGLE

(75) Inventors: Guolin Peng, Cedar Rapids, IA (US); Martin J. Steffensmeier, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 10/951,295

(22) Filed: Sep. 27, 2004

(51) Int. Cl.
*G02B 27/14* (2006.01)
*G09G 5/00* (2006.01)

(52) U.S. Cl. .......................... 359/630; 359/631; 345/7
(58) Field of Classification Search ................ 359/630, 359/631, 634, 636; 345/7, 8
See application file for complete search history.

(56) References Cited

U.S. PATENT DOCUMENTS

| | | | | |
|---|---|---|---|---|
| 4,900,133 A | | 2/1990 | Berman | 349/11 |
| 5,459,645 A | * | 10/1995 | Sattler et al. | 362/558 |
| 5,724,189 A | * | 3/1998 | Ferrante | 359/634 |
| 5,922,246 A | * | 7/1999 | Matsushita et al. | 252/582 |
| 6,130,730 A | * | 10/2000 | Jannson et al. | 349/65 |
| 6,137,222 A | * | 10/2000 | Ishihara et al. | 313/506 |
| 6,236,511 B1 | | 5/2001 | Brown | 359/634 |
| 6,377,369 B1 | * | 4/2002 | Preston | 359/15 |
| 6,567,014 B1 | | 5/2003 | Hansen et al. | 340/980 |
| 6,750,832 B1 | * | 6/2004 | Kleinschmidt | 345/7 |
| 6,789,901 B1 | * | 9/2004 | Kormos | 353/13 |
| 6,791,511 B2 | * | 9/2004 | Eschler et al. | 345/8 |
| 6,903,788 B2 | * | 6/2005 | Shiraogawa et al. | 349/115 |
| 6,924,849 B1 | * | 8/2005 | Clifton et al. | 349/5 |
| 6,943,930 B2 | * | 9/2005 | Mi et al. | 359/247 |

* cited by examiner

*Primary Examiner*—Jack Dinh
(74) *Attorney, Agent, or Firm*—Daniel M. Barbieri

(57) ABSTRACT

The present invention provides an optical display system and method for producing images and presenting the images for observation in combination with an observer's visual exterior view of an outside scene. The optical display system may include an image source for projecting an image, and a curved beam combination mirror (CBCM) or beam combination mirror (BCM) for reflecting the projected image toward an observer for observation. The image source may be a transmissive LCD, a reflective LCD, a digital micromirror device, a laser display, or the like. The CBCM or BCM may be positioned so that the observer, in a line of sight, may see a visual exterior view of an outside scene through the CBCM or BCM and the projected image in the CBCM or BCM.

14 Claims, 3 Drawing Sheets

COMPACT HEAD UP DISPLAY WITH WIDE VIEWING ANGLE

FIELD OF THE INVENTION

The present invention generally relates to the field of display systems, particularly to a method and optical display system for producing images and presenting the images for observation in combination with an observer's visual exterior view of an outside scene.

BACKGROUND OF THE INVENTION

A Head-Up Display (HUD) is a means of projecting information directly into a human's visual field. The HUD was pioneered for military aviation and has since been used in other applications. HUDs are typically used in aircraft to provide pilots with information superimposed onto their forward field of view through the aircraft windshield. The information displayed may be data or symbolic images indicative of flight conditions such as the operating condition of the aircraft, environmental information or guidance information for use in directing the aircraft to its destination. These images are presented in overlying fashion on the pilot's field of view so as not to interfere with the pilot's view of the background scene.

Although HUDs are useful in a variety of applications, there are several problems with conventional HUDs, among which high cost, narrow viewing angles, mechanical constraints, and low contrast of images are of particular concern. Moreover, conventional combiners are either undesirably thick and heavy for most applications, or are thin and undesirably highly curved. The thick combiners often contain a pair of cooperative lens elements, at least one of which includes an embedded spherical surface coated with a spectrally reflecting thin film. The external surfaces of these thick combiners are flat so as to provide an undistorted view of the background scene. Thin combiners, on the other hand, typically employ a pair of spherical external surfaces, one of which carries the spectrally reflecting thin film. Thin combiners thus typically do not provide the necessary undistorted view of the background scene, especially when the combiner is thick enough to be adequately durable.

Thus, it is desirable to provide a method and optical display system for producing images and presenting the images for observation in combination with an observer's visual exterior view of an outside scene, which method and system may solve the foregoing-described problems.

SUMMARY OF THE INVENTION

In a first exemplary aspect of the present invention, an optical display system for producing images and presenting the images for observation in combination with an observer's visual exterior view of an outside scene is provided. The optical display system includes an image source for projecting an image, and a curved beam combination mirror (CBCM) for reflecting the projected image with optical power toward an observer for observation. The image source may be a transmissive liquid crystal display (LCD), reflective LCD, digital micromirror device, laser display, or the like. The curved beam combination mirror (CBCM) is positioned so that the observer, in a line of sight, may see a visual exterior view of an outside scene through the curved beam combination mirror (CBCM) and the projected image in the curved beam combination mirror (CBCM).

In an additional exemplary aspect of the present invention, an optical display system for producing images and presenting the images for observation in combination with an observer's visual exterior view of an outside scene is provided. The optical display system includes an image source for projecting an image, and a beam combination mirror (BCM) for reflecting the projected image toward an observer for observation. The image source may be a transmissive LCD, reflective LCD, digital micromirror device, laser display, or the like. The beam combination mirror (BCM) is positioned so that the observer, in a line of sight, may see a visual exterior view of an outside scene through the beam combination mirror (BCM) and the projected image in the beam combination mirror (BCM).

In another exemplary aspect of the present invention, a method for producing images and presenting the images for observation in combination with an observer's visual exterior view of an outside scene includes steps as follows. An image is projected towards a curved beam combination mirror (CBCM) by an image source. The image source may be a transmissive LCD, reflective LCD, digital micromirror device, laser display, or the like. The projected image is reflected by the curved beam combination mirror (CBCM) with optical power toward an observer for observation. The curved beam combination mirror (CBCM) is positioned so that the observer, in a line of sight, may see a visual exterior view of an outside scene through the curved beam combination mirror (CBCM) and the projected image in the curved beam combination mirror (CBCM).

In a further exemplary aspect of the present invention, a method for producing images and presenting the images for observation in combination with an observer's visual exterior view of an outside scene includes steps as follows. An image is projected towards a beam combination mirror (BCM) by an image source. The image source may be a transmissive LCD, reflective LCD, digital micromirror device, laser display, or the like. The projected image is reflected by the beam combination mirror (BCM) toward an observer for observation. The beam combination mirror (BCM) is positioned so that the observer, in a line of sight, may see a visual exterior view of an outside scene through the beam combination mirror (BCM) and the projected image in the beam combination mirror (BCM).

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

In an exemplary aspect, the present invention may utilize a flat panel LCD as an image source and a beam combination mirror (BCM) or curved beam combination mirror (CBCM) as a combiner. Conventional combiners are either undesirably thick and heavy for most applications, or are thin and undesirably highly curved. The thick combiners often contain a pair of cooperative lens elements, at least one of which includes an embedded spherical surface coated with a spectrally reflecting thin film. The external surfaces of these thick combiners are flat so as to provide an undistorted view of the background scene. Thin combiners, on the other hand, typically employ a pair of spherical external surfaces, one of which carries the spectrally reflecting thin film. Thin combiners thus typically do not provide the necessary undistorted view of the background scene, especially when the combiner is thick enough to be adequately durable. Compared to a conventional combiner which often includes two or more lens elements, the present CBCM or BCM may include a single lens element. A BCM is a combiner which reflects light of a selected wavelength range and passes light of other wavelength ranges through. Relatively small BCMs may be used to reflect larger images. A CBCM is a combiner which reflects light of a selected wavelength range with optical power (i.e., magnification) and passes light of other wavelength ranges through. A CBCM may be spherical or non-spherical. When a CBCM is used, large images may be generated from a small LCD. Using a CBCM or BCM with a single lens element, the cost of a HUD may be greatly reduced. The present invention may utilize the LCD as an image source, which may generate images with very high contrast ratio. This is particularly the case when non-lambertian light sources are used in combination with the LCD. Being illuminated by highly efficient LEDs (Light Emitting Diodes) (with green LEDs being the most typical for HUD use), the flat panel LCD may be made very thin and light weight. Moreover, at least one of a compensation film, a Fresnel type lenses, a holographic device, or a brightness enhancement film may be included in the LCD to tailor (i.e., manage or redirect) the light passing through the LCD. Furthermore, the image source may be located at nearly any position i.e. sides, top, bottom, or at an angle relative to the CBCM or BCM. By electronically warping the image keystone and other distortions may be easily corrected. In addition, a HUD in accordance with the present invention may have very wide viewing angles, which may allow cross cockpit viewing or crosschecking.

Figure 1A:
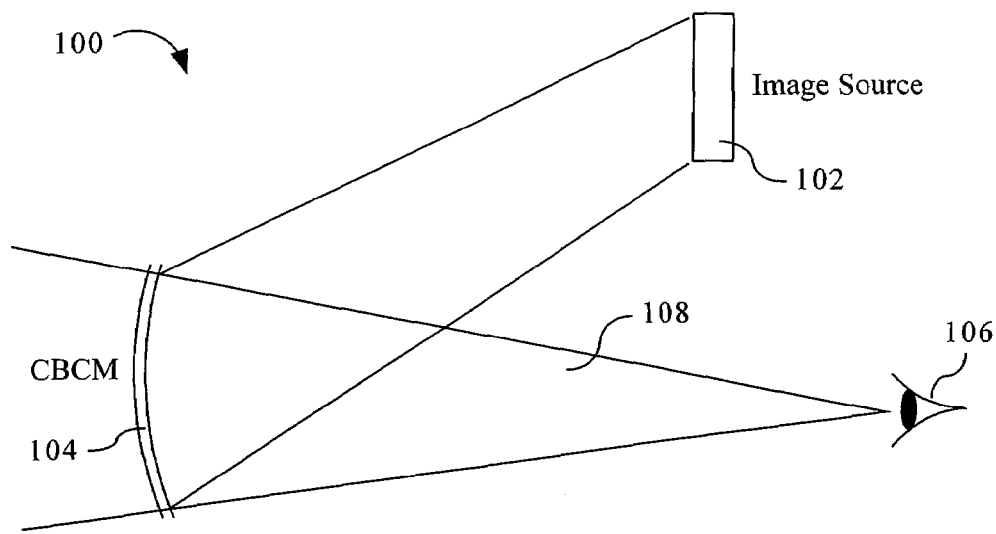
FIGS. 1A and 1B are schematic diagrams illustrating an optical display system for producing images and presenting the images for observation in combination with an observer's visual exterior view of an outside scene using CBCM in accordance with an exemplary embodiment of the present invention.
Figure 1B:
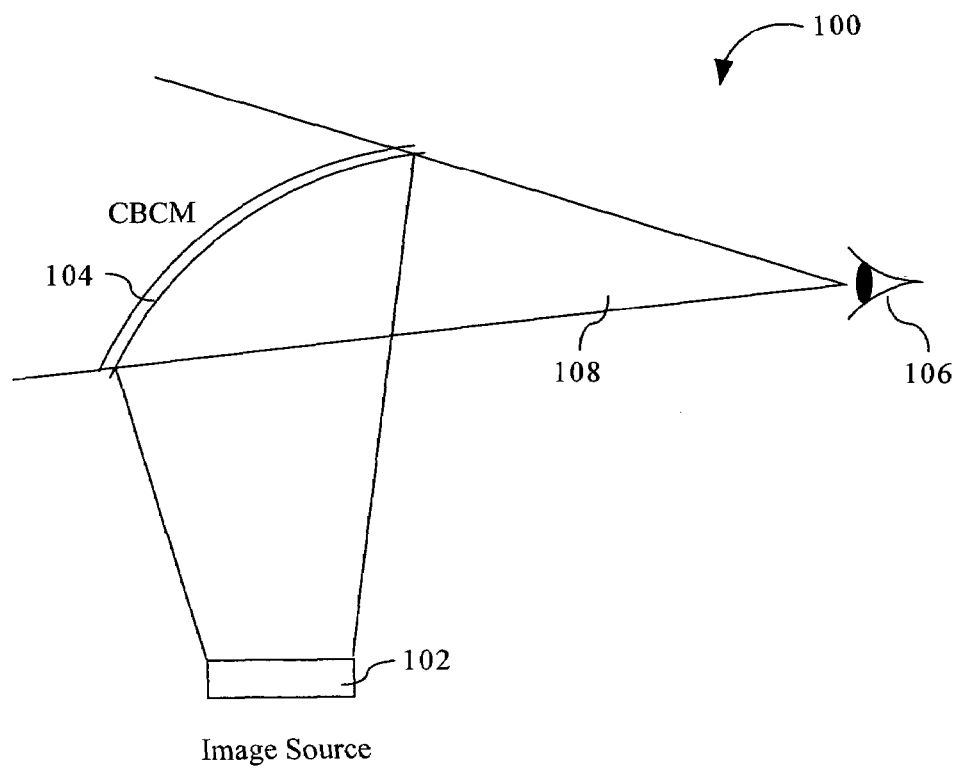

Referring now to FIGS. 1A and 1B, schematic diagrams illustrating an optical display system 100 for producing images and presenting the images for observation in combination with an observer's visual exterior view of an outside scene using CBCM in accordance with an exemplary embodiment of the present invention are shown. The optical display system 100 may be a HUD, or the like. The optical display system 100 may include an image source 102 for projecting an image, and a curved beam combination mirror (CBCM) 104 for reflecting the projected image with optical power toward an observer 106 for observation. The CBCM 104 may be spherical or non-spherical. The image source 102 may be a transmissive LCD, reflective LCD, digital micromirror device, laser display, or the like. For example, the image source 102 may be a flat panel LCD. When the image source 102 is a LCD, the LCD 102 may include a non-Lambertian light source, or may include at least one green LED (Light Emitting Diode) for illumination, and the LCD 102 may include at least one of a compensation film, a Fresnel type lenses, a holographic device, or a brightness enhancement film for redirecting (i.e., tailoring or managing) light passing through the LCD 102.

The curved beam combination mirror (CBCM) 104 may be positioned so that the observer 106, in a line of sight 108, may see a visual exterior view of an outside scene through the curved beam combination mirror (CBCM) 104 and the projected image in the curved beam combination mirror (CBCM) 104. The projected image in the curved beam combination mirror (CBCM) 104 may be no smaller than the LCD 102. In a preferred embodiment, the curved beam combination mirror (CBCM) 104 is suitable for focusing the projected image in the curved beam combination mirror (CBCM) 104 at infinity. This way, the observer 106 (e.g., a pilot, a co-pilot, or the like) may simultaneously watch the projected image in the CBCM 104 and the visual exterior view of an outside scene in the line of sight 108, without refocusing the eyesight of the observer 106.

According to the present invention, the image source 102 may be located at any angle relative to the line of sight 108 of the observer 106. For example, the image source 102 may be located above the line of sight 108 (see FIG. 1A) or below the line of sight 108 (see FIG. 1B). This way, flexibility in terms of relative positions between the combiner and the image source may be provided, thereby leading to a great convenience when placing the optical display system 100 in a crowed place (e.g., an airplane cockpit, a combat tank, or the like). The optical display system 100 may allow wide viewing angles to enable at least one of cross-cockpit viewing or crosschecking of the projected image in the curved beam combination mirror (CBCM) 104.

Figure 2A:
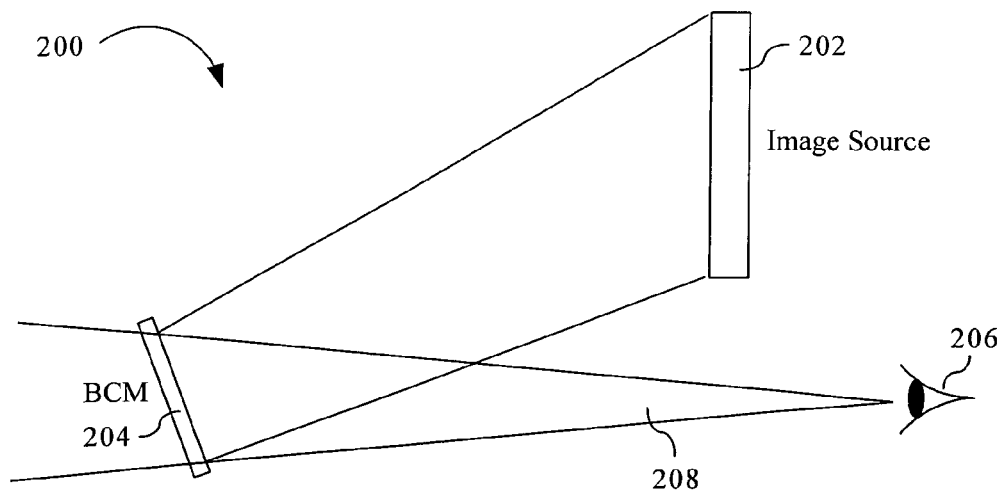
FIGS. 2A and 2B are schematic diagrams illustrating an optical display system for producing images and presenting the images for observation in combination with an observer's visual exterior view of an outside scene using BCM in accordance with an exemplary embodiment of the present invention.
Figure 2B:
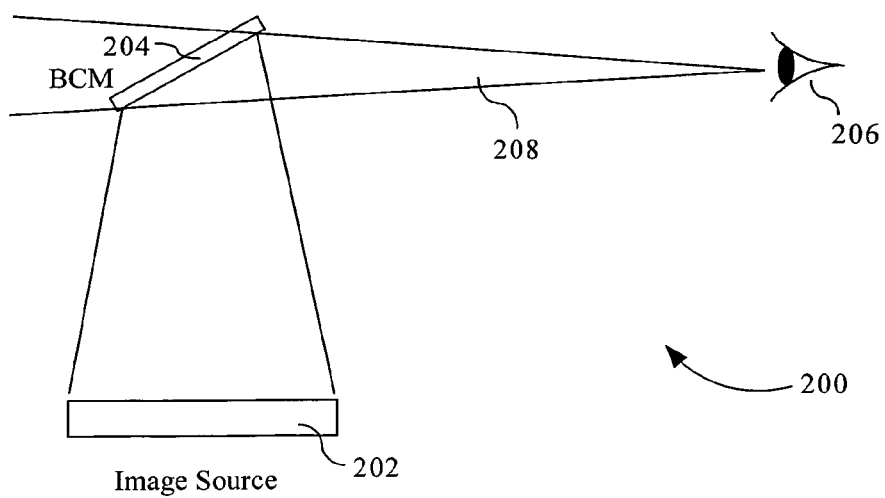

Referring to FIGS. 2A and 2B, schematic diagrams illustrating an optical display system 200 for producing images and presenting the images for observation in combination with an observer's visual exterior view of an outside scene using BCM in accordance with an exemplary embodiment of the present invention are shown. The optical display system 200 may be a HUD, or the like. The optical display system 200 may include an image source 202 for projecting an image, and a beam combination mirror (BCM) 204 for reflecting the projected image toward an observer 206 for observation. The image source 202 may be a transmissive LCD, reflective LCD, digital micromirror device, laser display, or the like. For example, the image source 202 may be a flat panel LCD. When the image source 202 is a LCD, the LCD 202 may include a non-Lambertian light source, or may include at least one green LED (Light Emitting Diode) for illumination, and the LCD 202 may include at least one of a compensation film, a Fresnel type lenses, a holographic device, or a brightness enhancement film for redirecting (i.e., tailoring or managing) light passing through the LCD 202.

The beam combination mirror (BCM) 204 may be positioned so that the observer 206, in a line of sight 208, may see a visual exterior view of an outside scene through the beam combination mirror (BCM) 204 and the projected image in the beam combination mirror (BCM) 204. The projected image in the beam combination mirror (BCM) 204 may be smaller than the LCD 202. The beam combination mirror (BCM) 204 may be not suitable for focusing the projected image in the beam combination mirror (BCM) 204 at infinity. Accordingly, the observer 206 (e.g., a pilot, a co-pilot, a vehicle driver, or the like) may not be able to simultaneously watch the projected image in the CBCM 204 and the visual exterior view of an outside scene in the line of sight 208 without refocusing the eyesight of the observer 206. However, the optical display system 200 may still provide some convenience for the observer 206 since the observer 206 does not need to look down at the control panel. Instead, the observer 206 may watch the projected image in the CBCM 204 and the visual exterior view of an outside scene in the line of sight 208, with the eyesight of the observer 206 refocused. The optical display system 200 may be applied to a situation (e.g., a combat tank, a driving vehicle, or the like), where the time spent by the observer 206 on refocusing his or her eyesight is not of critical importance.

According to the present invention, the image source 202 may be located at any angle relative to the line of sight 208 of the observer 206. For example, the image source 202 may be located above the line of sight 208 (see FIG. 2A) or below the line of sight 208 (see FIG. 2B). This way, flexibility in terms of relative positions between the combiner and the image source may be provided, thereby leading to a great convenience when placing the optical display system 200 in a crowed place (e.g., an airplane cockpit, a combat tank, or the like). The optical display system 200 may allow wide viewing angles to enable at least one of cross-cockpit viewing or crosschecking of the projected image in the beam combination mirror (BCM) 204.

Figure 3:
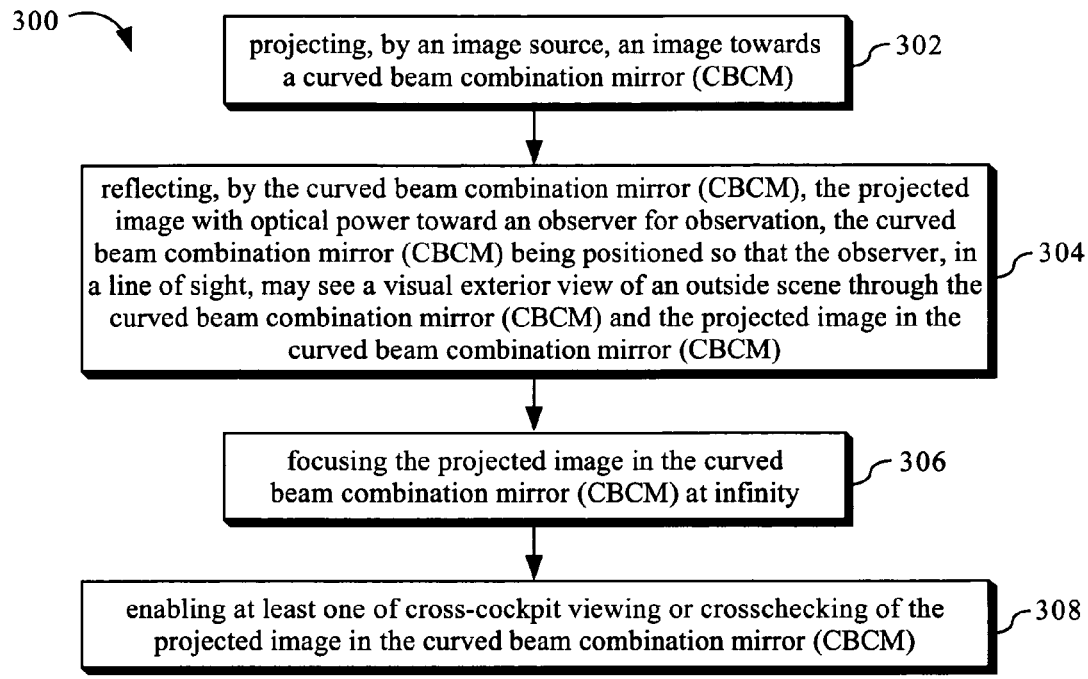
FIG. 3 is a flow diagram of a method for producing images and presenting the images for observation in combination with an observer's visual exterior view of an outside scene using CBCM in accordance with an exemplary embodiment of the present invention.

FIG. 3 is a flow diagram of a method 300 for producing images and presenting the images for observation in combination with an observer's visual exterior view of an outside scene using CBCM in accordance with an exemplary embodiment of the present invention. The method 300 may be implemented in the optical display system 100 shown in FIGS. 1A and 1B. The method 300 may start with a step 302 in which an image is projected towards a curved beam combination mirror (CBCM) by an image source. The CBCM may be spherical or non-spherical. The image source may be a transmissive LCD, reflective LCD, digital micromirror device, laser display, or the like. For example, the image source may be a flat panel LCD. When the image source is a LCD, the LCD may include a non-Lambertian light source, or may include at least one green LED (Light Emitting Diode) for illumination, and the LCD may include at least one of a compensation film, a Fresnel type lenses, a holographic device, or a brightness enhancement film for redirecting (i.e., tailoring or managing) light passing through the LCD.

In step 304, the projected image may be reflected by the curved beam combination mirror (CBCM) with optical power toward an observer for observation, and the curved beam combination mirror (CBCM) may be positioned so that the observer, in a line of sight, may see a visual exterior view of an outside scene through the curved beam combination mirror (CBCM) and the projected image in the curved beam combination mirror (CBCM). The projected image in the curved beam combination mirror (CBCM) may be no smaller than the LCD. The image source may be located at any angle relative to the line of sight of the observer. For example, the image source may be located above the line of sight or below the line of sight.

The projected image in the CBCM may be focused at infinity 306. This way, the observer (e.g., a pilot, a co-pilot, a vehicle driver, or the like) may simultaneously watch the projected image in the CBCM and the visual exterior view of an outside scene in the line of sight, without refocusing the eyesight of the observer. At least one of cross-cockpit viewing or crosschecking of the projected image in the CBCM may be enabled by the CBCM 308.

Figure 4:
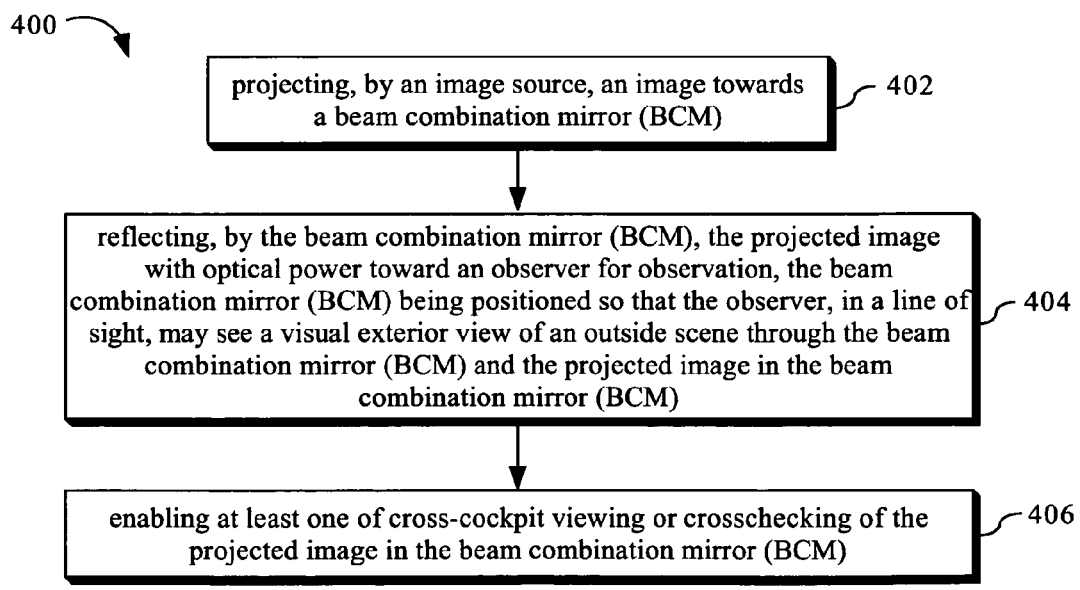
FIG. 4 is a flow diagram of a method for producing images and presenting the images for observation in combination with an observer's visual exterior view of an outside scene using BCM in accordance with an exemplary embodiment of the present invention.

FIG. 4 is a flow diagram of a method 400 for producing images and presenting the images for observation in combination with an observer's visual exterior view of an outside scene using BCM in accordance with an exemplary embodiment of the present invention. The method 400 may be implemented in the optical display system 200 shown in FIGS. 2A and 2B. The method 400 may start with a step 402 in which an image is projected towards a beam combination mirror (BCM) by an image source. The image source may be a transmissive LCD, reflective LCD, digital micromirror device, laser display, or the like. For example, the image source may be a flat panel LCD. When the image source is a LCD, the LCD may include a non-Lambertian light source, or may include at least one green LED (Light Emitting Diode) for illumination, and the LCD may include at least one of a compensation film, a Fresnel type lenses, a holographic device, or a brightness enhancement film for redirecting (i.e., tailoring or managing) light passing through the LCD.

In step 404, the projected image may be reflected by the beam combination mirror (BCM) toward an observer for observation, and the beam combination mirror (BCM) may be positioned so that the observer, in a line of sight, may see a visual exterior view of an outside scene through the beam combination mirror (BCM) and the projected image in the beam combination mirror (BCM). The projected image in the beam combination mirror (BCM) may be smaller than the LCD. The image source may be located at any angle relative to the line of sight of the observer. For example, the image source may be located above the line of sight or below the line of sight. At least one of cross-cockpit viewing or crosschecking of the projected image in the BCM may be enabled by the BCM 406.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for producing and presenting images for observation, comprising:

generating an image with an image source;

projecting the image directly from the image source towards a curved beam combination mirror (CBCM) which includes a single lens element and reflects a wavelength projected by said image source and passes other wavelengths;

reflecting, by said curved beam combination mirror (CBCM), said projected image with optical power toward an observer for observation, said curved beam combination mirror (CBCM) being positioned so that said observer, in a line of sight, views a visual exterior view of an outside scene through said curved beam combination mirror (CBCM) and said projected image in said curved beam combination mirror (CBCM); and electronically warping said image to correct for keystone distortion.

2. The method of claim 1, wherein said image source is an LCD.

3. The method of claim 2, wherein said LCD includes a non-Lambertian light source.

4. The method of claim 2, wherein said LCD includes at least one green LED (Light Emitting Diode) for illumination.

5. The method of claim 2, wherein, said LCD includes at least a compensation film for redirecting light passing through said LCD.

6. The method of claim 2, wherein said LCD includes at least a Fresnel type lenses for redirecting light passing through said LCD.

7. The method of claim 2, wherein said LCD includes at least a holographic device for redirecting light passing through said LCD.

8. The method of claim 2, wherein said LCD includes at least a brightness enhancement film for redirecting light passing through said LCD.

9. The method of claim 2, wherein said projected image in said curved beam combination mirror (CBCM) is not smaller than said LCD.

10. The method of claim 1, further comprises focusing said projected image in said curved beam combination mirror (CBCM) at infinity.

11. The method of claim 1, wherein said image source is located at an angle relative to said line of sight of said observer.

12. The method of claim 11, wherein said image source is located above said line of sight of said observer.

13. The method of claim 11, wherein said image source is located below said line of sight of said observer.

14. The method of claim 1, further comprises enabling at least one of cross-cockpit viewing or crosschecking of said projected image in said curved beam combination mirror (CBCM).

* * * * *